US008159541B2

(12) United States Patent
McLeod

(10) Patent No.: US 8,159,541 B2
(45) Date of Patent: Apr. 17, 2012

(54) IMAGE STABILIZATION METHOD AND APPARATUS

(75) Inventor: Stuart McLeod, West Lothian (GB)

(73) Assignee: STMicroelectronics (Research & Development) Limited, Marlow-Buckinghamshire (GB)

( * ) Notice: Subject to any disclaimer, the term of this patent is extended or adjusted under 35 U.S.C. 154(b) by 676 days.

(21) Appl. No.: 12/053,744

(22) Filed: Mar. 24, 2008

(65) Prior Publication Data

US 2008/0252736 A1 Oct. 16, 2008

(30) Foreign Application Priority Data

Apr. 16, 2007 (EP) ..................................... 07106266

(51) Int. Cl.
*H04N 5/228* (2006.01)
(52) U.S. Cl. ............ 348/208.2; 348/208.11; 348/208.12
(58) Field of Classification Search ............... 348/208.2, 348/208.7
See application file for complete search history.

(56) References Cited

U.S. PATENT DOCUMENTS

| | | | | |
|---|---|---|---|---|
| 5,365,303 A * | 11/1994 | Yamasaki et al. | ................ | 396/53 |
| 5,826,115 A * | 10/1998 | Washisu et al. | ................ | 396/55 |
| 6,292,215 B1 * | 9/2001 | Vincent | ......................... | 348/169 |
| 6,778,768 B2 * | 8/2004 | Ohkawara et al. | ............... | 396/55 |
| 7,307,653 B2 * | 12/2007 | Dutta | ......................... | 348/208.7 |
| 7,554,578 B2 * | 6/2009 | Molgaard | .................. | 348/231.3 |
| 7,609,950 B2 * | 10/2009 | Washisu | ......................... | 396/53 |
| 7,639,935 B2 * | 12/2009 | Bartilson et al. | ................ | 396/78 |
| 7,907,838 B2 * | 3/2011 | Nasiri et al. | .................... | 396/55 |
| 2003/0002746 A1 | 1/2003 | Kusaka | ......................... | 382/255 |
| 2005/0285948 A1 * | 12/2005 | Weinberg | ................ | 348/208.99 |
| 2006/0072019 A1 * | 4/2006 | Stavely et al. | ........... | 348/208.99 |
| 2007/0132856 A1 * | 6/2007 | Saito et al. | ............... | 348/208.99 |
| 2010/0002086 A1 * | 1/2010 | Chien et al. | ................ | 348/208.2 |

FOREIGN PATENT DOCUMENTS

WO WO0180736 11/2001

* cited by examiner

*Primary Examiner* — Ngoc-Yen Vu
(74) *Attorney, Agent, or Firm* — Allen, Dyer, Doppelt, Milbrath & Gilchrist, P.A.

(57) ABSTRACT

An image stabilization apparatus includes accelerometers, a proximity sensor and a processor. Each accelerometer determines acceleration along an axis of a plane parallel to a focal plane of an image capture device. The accelerometers output respective acceleration data to the processor. The proximity sensor obtains a measurement of the distance between the focal plane of the image capture device and an object plane. The proximity sensor outputs distance data to the processor. The processor processes the distance data and the acceleration data to produce correction data to correct image data captured during motion of the image capture device.

27 Claims, 4 Drawing Sheets

IMAGE STABILIZATION METHOD AND APPARATUS

FIELD OF THE INVENTION

The present invention relates to image stabilization, and more particularly, but not exclusively, to an image stabilization method and apparatus that compensates for translational motion of an image capture device. Even more particularly, but not exclusively, the present invention relates to an image stabilization method and apparatus suitable for use in a mobile telephone.

BACKGROUND OF THE INVENTION

Motion of a user's hand when operating an image capture device, such as a still camera of a mobile telephone or a video camera, for example, causes both rotational and linear translational motion of the image capture device. In the case of a video camera such motion results in the production of an unsteady video sequence. In a still camera a blurred captured image results.

When an object plane is a substantial distance from an image capture device, for example 1000 mm or more, rotational motion of the image capture device is the dominant form of image degradation. However, as the distance between the object plane and the image capture device decreases, typically below 1000 mm, linear translational motion becomes the dominant form of image degradation. This problem can be particularly acute when a detailed captured image of a small object, for example a business card, is required. In such an example, the translational motion can result in details on the card becoming illegible.

Compensation for rotational motion of an image capture device is currently employed in certain digital video cameras and also in certain high-end, still cameras. Typically, such rotation compensation systems employ gyroscopes that record the magnitude and the direction of rotational motion. Usually, compensation for the rotational motion is carried out during the processing of the digital image signal.

SUMMARY OF THE INVENTION

According to a first aspect of the present invention, an image stabilization apparatus comprises plurality of accelerometers, a proximity sensor and a processor. Each of the accelerometers may be arranged to determine an acceleration along an axis of a plane parallel to a focal plane of an image capture device, and to output respective acceleration data. At least two of the axes may be inclined or intersecting with respect to each other.

The proximity sensor may obtain a measurement indicative of the distance between the focal plane of the image capture device and an object plane, and to output distance data. The processor may receive the respective acceleration data from each of the accelerometers, and may receive the distance data from the proximity sensor. Also the processor may process the distance data and the acceleration data to produce correction data to correct image data captured by an image capture device that was in motion.

Such an apparatus may allow for displacement in the plane containing the image capture device to be calculated and compensated. This results in a reduction of blurring images due to such motion.

At least one of the accelerometers may comprise a linear accelerometer. Linear accelerometers have good reliability, and simple signal outputs making them easy to use. At least one of the accelerometers may comprise a microelectromechanical systems (MEMS) accelerometer. The accelerometers may comprise discrete accelerometers. Alternatively, the accelerometers may be formed upon a single component, for example a single integrated circuit (IC).

The accelerometers may be arranged in an L-shaped configuration. Alternatively, the accelerometers may be arranged in a T-shaped configuration.

The use of accelerometers that may be mutually perpendicular to one another allows angular accelerations about pitch and yaw axes of the focal plane to be determined, as well as linear accelerations. This may increase the accuracy of compensation for motion of the image capture device. This may also allow compensation for an angular handshake that is desirable in order to distinguish between the translational motion, and an inclinometer effect that is experienced by accelerometers that are sensitive to gravity as well as linear acceleration.

An image capture device may be located at the mid-point of the accelerometers lying along a common axis when the accelerometers are arranged in the T-shaped configuration. The processor may calculate a vector difference between the acceleration data received from each of the accelerometers lying along the common axis. The processor may calculate linear displacement data indicative of the linear displacement of the image capture device associated with the vector difference in acceleration. The processor may incorporate a correction, using the linear displacement data, when producing the correction data.

The correction data may be applied to captured image data at an image coprocessor. Alternatively, or additionally, the correction data may be arranged to control a displacement device to displace the image capture device in response to the accelerations measured at the accelerometers.

The processor may sample the accelerometers and the proximity sensing means or proximity sensor at a frequency of at least 40 Hz. This may allow the processor to interface with standard data buses such as the Inter-IC ($I^2C$) bus and the serial peripheral interface (SPI) bus.

According to second aspect of the present invention, an image stabilization method comprises generating acceleration data corresponding to a measure of at least one acceleration using an accelerometer; generating distance data corresponding to a distance between an object and a focal plane of an image capture device using proximity sensing means or sensor; and processing both the acceleration data and the distance data in order to produce correction data. The correction data may correct an image captured by the image capture device that was in motion.

According to a third aspect of the present invention, an image capture device may comprise an image stabilization apparatus according to the first aspect as discussed above.

At least one of the accelerometers may be located within, or upon, the image capture device. The processor may be arranged to control a mechanical correction device using the correction data. The mechanical correction device may move a lens of the image capture device.

Alternatively, or additionally, the processor may be arranged to communicate the correction data to a coprocessor that is arranged to apply the correction data to image data. The image capture device may comprise any one of the following: a digital still camera, a digital video camera, or a web-cam.

According to a fourth aspect of the present invention, a mobile telecommunications device comprises an image capture device according to the third aspect as discussed above. At least one of the accelerometers may be located within, or upon, the mobile telecommunications device. The mobile communications device may comprise any one of the following: a mobile telephone, a personal digital assistant, or a Blackberry™.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENTS

Figure 1A:
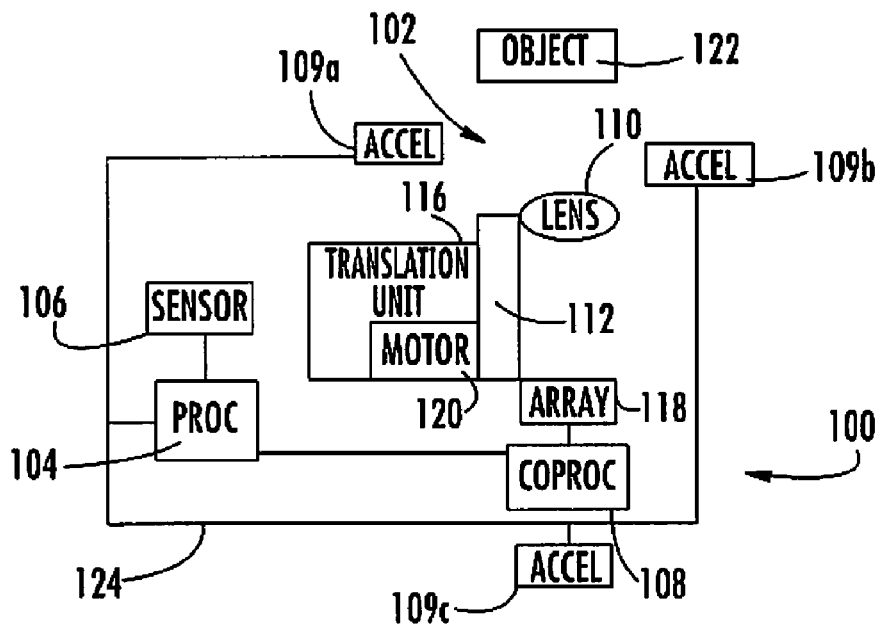
FIGS. 1a and 1b are schematic diagrams of different embodiments of an image capture device comprising an image stabilization apparatus according to the present invention.
Figure 1B:
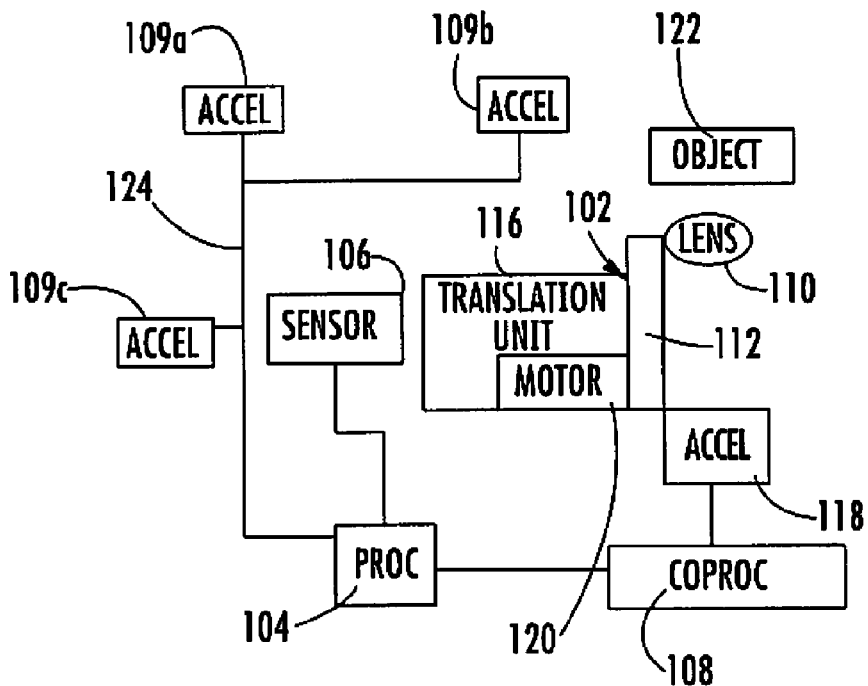
Figure 1C:
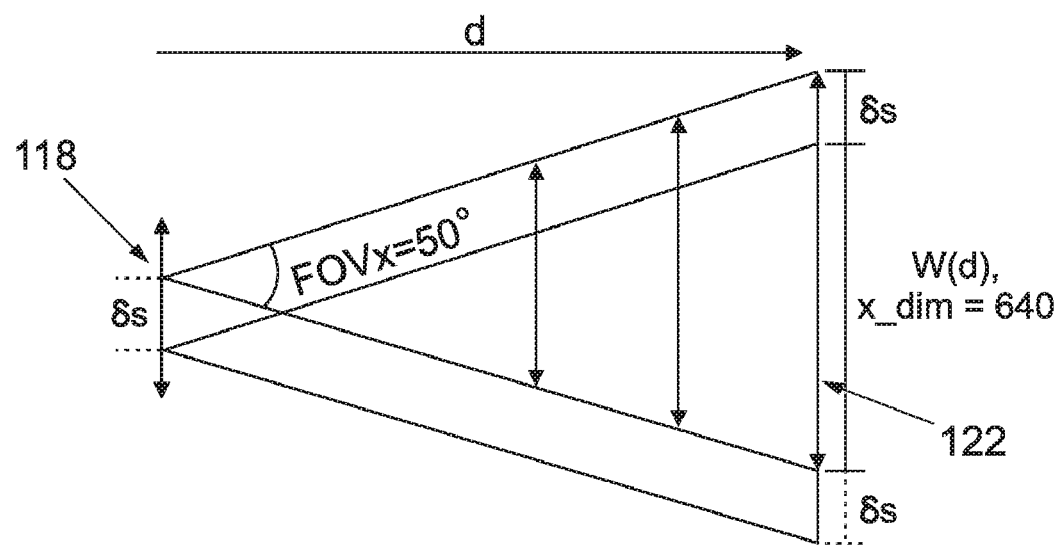
FIG. 1c is a schematic diagram illustrating the geometry used to calculate a pixel delta for the image capture devices of FIGS. 1a and 1b.

Referring now to FIGS. 1a to 1c, an image capture device 100 comprises an image sensor stack 102, a processor 104, a proximity sensor 106, an image coprocessor 108 and accelerometers 109a-109c. The image sensor stack 102 comprises a lens 110, a focus unit 112, a lens translation unit 116 and an image sensor array 118.

In one embodiment, the proximity sensor 106 comprises an infra-red (IR) proximity sensor as will be known to those skilled in the art. In an alternative embodiment, the proximity sensor 106 comprises an output from the focus unit 112 of the image sensor stack 102.

The image coprocessor 108 is used to process image data captured by the image capture array 118. Typically, the accelerometers 109a-109c are linear accelerometers. Usually, the accelerometers 109a-109c are MEMS accelerometers. Typically, the image sensor array 118 is a complementary metal oxide semiconductor (CMOS) array.

The lens translation unit 116 comprises a motor 120 that is arranged to translate the image sensor stack 102 in a plane perpendicular to the longitudinal axis of the image sensor stack 102. Typically, the motor 120 is a servo-motor or a stepper motor.

An image of an object 122 is focussed onto the image sensor array 118 using the focus unit 112. The focus unit 112 focuses the image by motion of the lens 110 along the longitudinal axis of the image sensor stack 102 in a manner known to those skilled in the art. Image signals from the image sensor array 118 are passed to the image co-processor 108 for processing.

In the case where the image capture device 100 is hand held, the image sensor stack 102 experiences motion corresponding to movement of the user's hand. The accelerometers 109a-109c measure accelerations due to the motion of the user's hand. Signals corresponding to the accelerations measured by the accelerometers 109a-109c are passed to the processor 104 via a serial bus 124, for example an I²C or an SPI bus. Where necessary the output of each accelerometer 109a-109c has its own dedicated bus line.

The autofocus control loop of the focus unit 112 controls the position of the lens 110 in relation to the image sensor array 118. This dictates the distance between the image sensor array 118 and the object 122 that is in focus. Thus, the position of the lens 110 is known. Typically, the position of the lens 110 is determined either by using a deterministic driver such as a stepper motor, or by using a position sensor such as a Hall effect sensor or magnetic sensor.

The distance between the image sensor stack 102 and the object 122 is required by the processor 104 in order to calculate correction for a user's handshake. This information is already known to the processor 104 running the autofocus control loop. Alternatively, if the position sensor 106 is running a dedicated autofocus control loop it can pass the information to the processor 104 using the data bus 124.

Typically, the processor 104 performs double numerical integration on the acceleration measurement data recorded at each of the accelerometers 109a-109c in order to determine distances over which the image sensor array 108 moves during the measurement. This is valid as $\iint(\delta^2 S/\delta t^2)=S$, where s=distance and t=time. The use of three accelerometers allows the magnitude and direction of both linear and rotational motion within the plane containing the accelerometers 109a-109c to be determined by suitable subtractive and additive combinations of the measured accelerations.

The proximity sensor 106 measures the distance to the object 122 and passes data corresponding to this distance to the processor 104. The processor 104 determines an offset between the desired center focal point of the image capture array 118 and the actual center focal point of the image capture array 118.

Referring now in particular to FIG. 1c, the translational pixel delta for horizontal motion in a video graphic array (VGA) sensor array 118 is calculated as follows:

$$\text{Focal distance} = d_x$$
$$\text{Field of view in} \times \text{dimension} = FOVx = 50°$$
$$\text{x\_dim} = 640 \text{ pixels}$$
$$\text{Image Width} = W(d)$$
$$\text{Pixel delta} = \delta P_x$$

$$W(d) = 2d\sin\left(\frac{FOV_x}{2}\right)$$
$$\delta P_x = \delta S \times \frac{640}{W(d)}$$
$$\delta P_x = \delta S \times \frac{640}{2d\sin\left(\frac{FOV_x}{2}\right)}$$

The variable δs is determined from measurements made at the accelerometers 109a-109c. If the accelerometers 109a-109c are not affected by the inclinometer effect of gravity, then δs is calculated by performing the double integral of the translational acceleration that is measured directly from the accelerometers 109a-109c. If the accelerometers 109a-109c do measure gravity in addition to the translational acceleration, then the component of the change in the gravity vector due to the angular movement of the accelerometers 109a-109c needs to be removed. This is done by calculating the angular accelerations of the image capture device 100 by taking the difference of the accelerometers 109a-109c in the T-shaped or L-shaped configuration and double integrating. Knowing the angular motion of the image capture device 100, it is then possible to eliminate the effect of rotation on the gravity vector in the accelerometer data, which results in isolating the translational motion. It will be appreciated that the same method of calculating pixel delta is used for vertical motion and higher resolution sensors Correction data is generated at the processor 104 to control the motor 120 so that the image sensor stack 102 is moved to compensate for the calculated offset between the desired and the actual centers of the focal point of the image capture array 118. The correction data is passed to the motor 120 such that it is actuated to translate the image sensor stack 102 in a plane perpendicular to the longitudinal axis of the image sensor stack 102. Typically, the correction data is calculated using algorithms that are well known to those skilled in the art.

The image sensor array 118 captures further frames at the corrected position until the accelerometers 109a-109c are again sampled, and a further mechanical correction is effected using the motor 120. As human handshake typically changes at <10 Hz. The mechanical correction usually occurs at a similar frequency of the handshake.

In a digital correction system, the frame rate is typically 25 or 30 frames per second. The handshake correction is applied to each frame by cropping the video frames, and displacing the cropping window by a pixel delta calculated from the accelerometer data as above. For still stabilization the correction is applied to multiple short exposure frames whose duration depends upon the exposure time.

Referring now more particularly to FIG. 1a, the accelerometers 109a-109c are arranged in a T-shaped configuration with the image sensor array 118 being located approximately midway between the two accelerometers 109a, 109b lying along a common axis. This arrangement of the accelerometers 109a-109c allows the linear displacement of the image sensor array 118 to be determined by the double integration of the difference of the accelerations measured at the two accelerometers 109a, 109b lying along the common axis.

Referring now to FIG. 1b, the accelerometers 109a-109c are arranged in an L-shaped configuration with the image sensor array 118 being located approximately midway along an axis between two of the accelerometers 109a,109b. L-shaped and T-shaped accelerometer configurations take account of the image capture device 100 within a mobile telecommunication device, for example a mobile phone.

If the image capture device 100 is in the corner of a phone, then it is advantageous to use the L-shaped accelerometer configuration in order position the accelerometers 109a-109c as far from the image capture device as is practicable. The further the accelerometers 109a-109c are from the image capture device 100 the more accurate the resolution of angular motion that is required for stabilizing long focal lengths, and for resolving the translational motion from the accelerometer data in the presence of gravity. If the camera is at the edge or middle of the phone then the T-shaped configuration yields a better resolution of angular motion.

Figure 2:
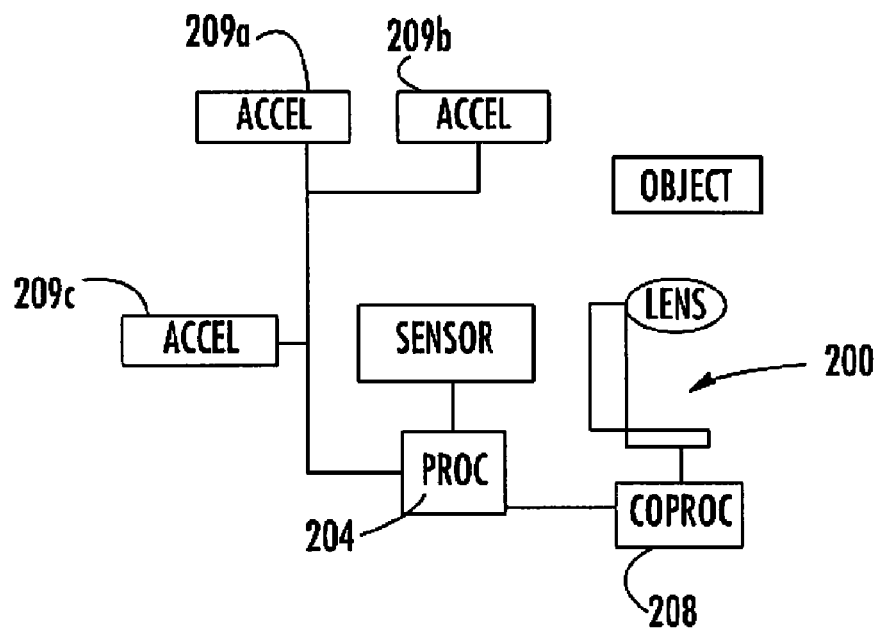
FIG. 2 is a schematic diagram of an alternative embodiment of an image capture device comprising an image stabilization apparatus according to the present invention.

Referring now to FIG. 2, an embodiment of an image capture device 200 is substantially similar to that described above with reference to FIGS. 1a and 1b. Accordingly, similar features are accorded similar reference numerals in the two hundred series.

In the illustrated embodiment, there is no lens translation unit or motor. In this embodiment all of the image stabilization is carried out computationally at the image co-processor 208 using correction data generated at the processor 204. This computational image stabilization is achieved by interpolating between captured frames using known interpolation algorithms, and incorporating a correction for the calculated pixel 5 between frames. An example of such an interpolation is a correction algorithm for video which involves cropping each frame so that it has a border of approximately 5% of its total dimension. The position of this cropping window is moved from one frame to the next. Typically, in still photography, the sub-frames are added together before noise reduction is performed.

It will be appreciated that although shown with the accelerometers 209a-209c in an L-shaped configuration, the embodiment of FIG. 2 is equally applicable when the accelerometers are in a T-shaped configuration. It will be appreciated that although shown using three accelerometers, four accelerometers may be arranged in a cross conformation with the image capture device lying at the intersection of the axes of the arms of the cross.

It will be appreciated that the image co-processor 108 of FIGS. 1a and 1b can be used as described above with reference to FIG. 2 such that the image capture device 100 of FIG. 1 can carry out hybrid mechanical-computational image stabilization. This involves the processor 104 generating two types of correction data: control data for the motor 120, and pixel 6 correction data to be passed to the image coprocessor 108.

Figure 3:
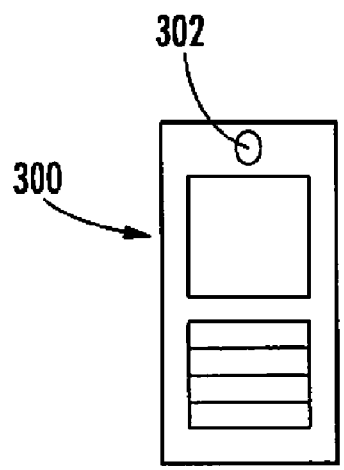
FIG. 3 is a schematic diagram of a telecommunications device comprising an image capture device as illustrated in either of FIGS. 1a and 1b.

Referring now to FIG. 3, a mobile telephone 300 comprises an image capture device 302 as described above with reference to any one of FIG. 1a, 1b or 2.

Figure 4:
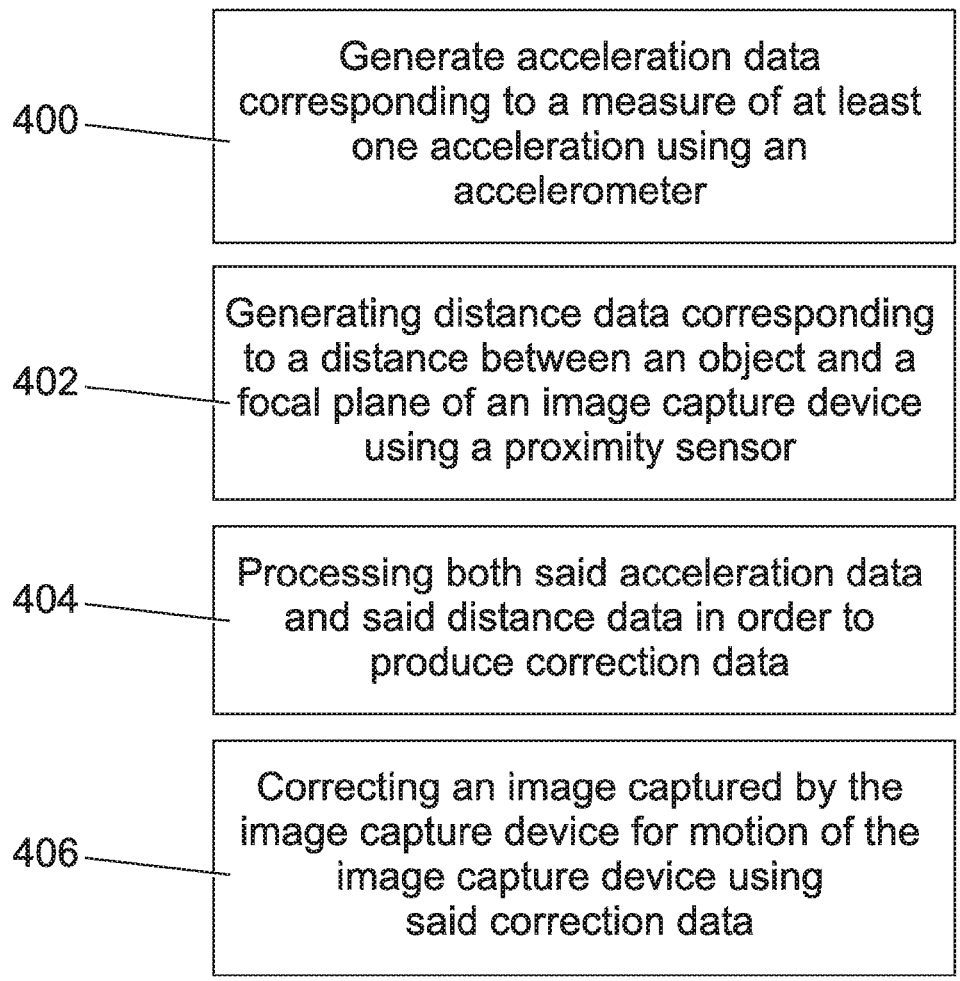
FIG. 4 is a flow chart detailing the method steps for image stabilization according to the present invention.

Referring now to FIG. 4, a method of an image stabilization comprises generating acceleration data corresponding to a measure of at least one acceleration using an accelerometer (Step 400). Distance data corresponding to a distance between an object and a focal plane of an image capture device is generated using proximity sensing means (Step 402). Both the acceleration data and the distance data are processed in order to produce correction data (Step 404). The correction data corrects an image captured by the image capture device that was in motion (Step 406).

That which is claimed:

1. An image stabilization apparatus comprising:
    a plurality of accelerometers to determine acceleration along axes of a plane parallel to a focal plane of an image capture device, with at least two of the axes inclined with respect to each other, and each accelerometer to output respective acceleration data;
    an infra-red (IR) proximity sensor to measure a distance between the focal plane of the image capture device and an object plane corresponding to image data to be captured by the image capture device, and to output distance data; and
    a processor to process the respective acceleration data from said plurality of accelerometers and the distance data from said (IR) proximity sensor to generate correction data to correct the image data captured during motion of the image capture device, with the correction data being used to
        compensate for a calculated offset between a desired and an actual center of a focal point of the image capture device, and
        determine an angular motion of the image capture device to reduce an effect of rotation on a gravity vector in the respective acceleration data.

2. The image stabilization apparatus according to claim 1 wherein at least one of said plurality of accelerometers comprises a linear accelerometer.

3. The image stabilization apparatus according to claim 1 wherein at least one of said plurality of accelerometers comprises a microelectromechanical systems (MEMS) accelerometer.

4. The image stabilization apparatus according to claim 1 wherein said plurality of accelerometers is arranged in an L-shaped configuration.

5. The image stabilization apparatus according to claim 1 wherein said plurality of accelerometers is arranged in a T-shaped configuration.

6. The image stabilization apparatus according to claim 5 wherein the T-shaped configuration has a common axis between two accelerometers of said plurality of accelerometers; and said image capture device is at a mid-point with respect to the common axis.

7. The image stabilization apparatus according to claim 6 wherein said processor calculates a vector difference between the respective acceleration data received from the two accelerometers along the common axis.

8. The image stabilization apparatus according to claim 7 wherein said processor calculates linear displacement data corresponding to linear displacement of said image capture device associated with the vector difference in acceleration.

9. The image stabilization apparatus according to claim 8 wherein said processor uses the linear displacement data when producing the correction data.

10. The image stabilization apparatus according to claim 1 wherein said processor samples said plurality of accelerometers and said proximity sensor at a frequency >40 Hz.

11. The image stabilization apparatus according to claim 1 further comprising an image coprocessor to apply the correction data to the captured image data.

12. The image stabilization apparatus according to claim 1 further comprising a displacement device to displace the image capture device based on the acceleration data.

13. An imaging system comprising:
an image capture device to capture image data, and having a focal plane associated therewith;
an image sensor stack comprising a focus unit to focus the image data onto said image capture device; and
an image stabilization apparatus to stabilize the captured image data during motion of said image capture device, said image stabilization apparatus comprising
a plurality of accelerometers to determine acceleration along axes of a plane parallel to the focal plane of said image capture device, and each accelerometer to output respective acceleration data,
a proximity sensor comprising an output from said focus unit to measure a distance between the focal plane of said image capture device and an object plane corresponding to the captured image data, and to output distance data, and
a processor to process the respective acceleration data from said plurality of accelerometers and the distance data from said proximity sensor to generate correction data, with the correction data being used to
move said image sensor stack to compensate for a calculated offset between a desired and an actual center of the focal point of said image capture device, and
determine an angular motion of said image capture device to reduce an effect of rotation on a gravity vector in the respective acceleration data.

14. The imaging system according to claim 13 wherein at least one of said plurality of accelerometers is on said image capture device.

15. The imaging system according to claim 13 further comprising a mechanical correction device; and wherein said processor controls said mechanical correction device based on the correction data.

16. The imaging system according to claim 15 wherein said image capture device comprises a lens: and wherein said mechanical correction device moves said lens based on the correction data.

17. The imaging system according to claim 13 further comprising a coprocessor to receive the correction data from said processor, with said coprocessor to apply the correction data to the captured image data.

18. The imaging system according to claim 13 wherein at least one of said plurality of accelerometers comprises a linear accelerometer.

19. The imaging system according to claim 13 wherein said plurality of accelerometers is arranged in an L-shaped configuration.

20. The imaging system according to claim 13 wherein said plurality of accelerometers is arranged in a T-shaped configuration.

21. The imaging system according to claim 13 wherein said image capture device and said image stabilization apparatus are configured so that the imaging system is at least one of a digital still camera, a digital video camera, a web-cam, a mobile telephone and a personal digital assistant.

22. A method for stabilizing an image captured by an image capture device using an image stabilization apparatus, the image stabilization apparatus comprising a plurality of accelerometers, an infra-red (IR) proximity sensor and a processor, the method comprising:
generating respective acceleration data via the plurality of accelerometers along axes of a plane parallel to a focal plane of the image capture device, with at least two of the axes inclined with respect to each other;
generating distance data via the (IR) proximity sensor between the focal plane of the image capture device and an object plane corresponding to image data captured by the image capture device; and
generating correction data via the processor to correct the captured image data captured during motion of the image capture device based on processing the respective acceleration data from the plurality of accelerometers and the distance data from the (IR) proximity sensor, with the correction data being used to
compensate for a calculated offset between a desired and an actual center of a focal point of the image capture device, and
determine an angular motion of the image capture device to reduce an effect of rotation on a gravity vector in the respective acceleration data.

23. The method according to claim 22 wherein at least one of the plurality of accelerometers comprises a linear accelerometer.

24. The method according to claim 23 wherein the plurality of accelerometers is arranged in an L-shaped configuration.

25. The method according to claim 23 wherein the plurality of accelerometers is arranged in a T-shaped configuration.

26. The method according to claim 25 wherein the T-shaped configuration has a common axis between two accelerometers of the plurality of accelerometers; and the image capture device is at a mid-point with respect to the common axis; and wherein
the processor calculates a vector difference between the respective acceleration data received from the two accelerometers along the common axis.

27. The method according to claim 26 wherein the processor calculates linear displacement data corresponding to linear displacement of the image capture device associated with the vector difference in acceleration.

* * * * *